Dec. 9, 1930.  M. L. BOWERS  1,784,330
WHEEL RETAINER
Filed June 14, 1929   2 Sheets-Sheet 1
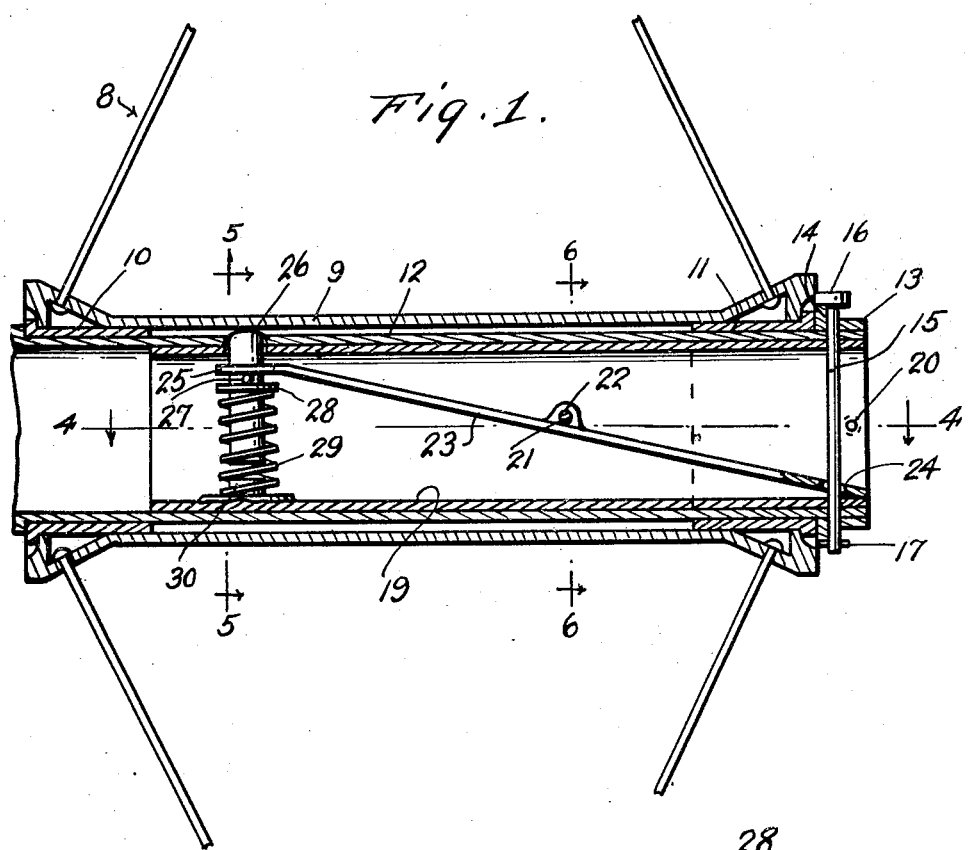
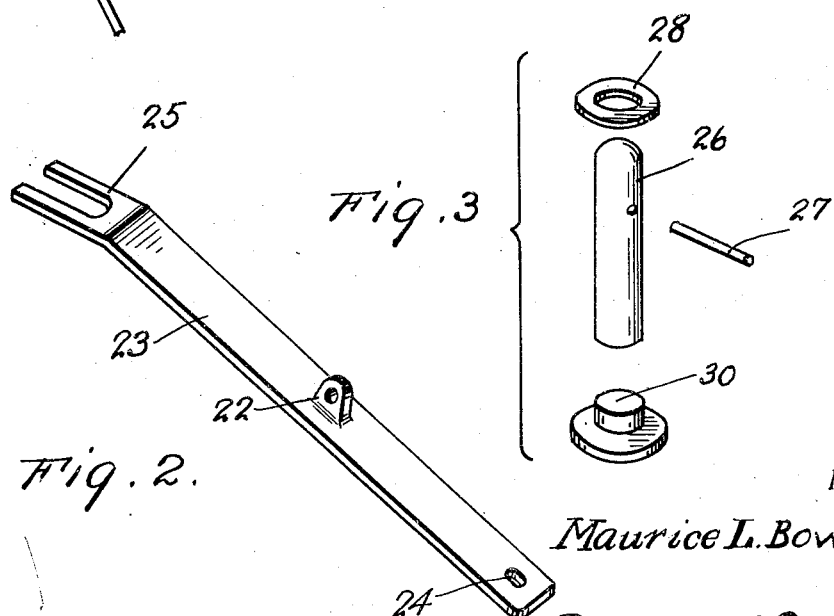
Inventor
*Maurice L. Bowers*
By *Clarence A. O'Brien*
Attorney Dec. 9, 1930.  M. L. BOWERS  1,784,330
WHEEL RETAINER
Filed June 14, 1929  2 Sheets-Sheet 2
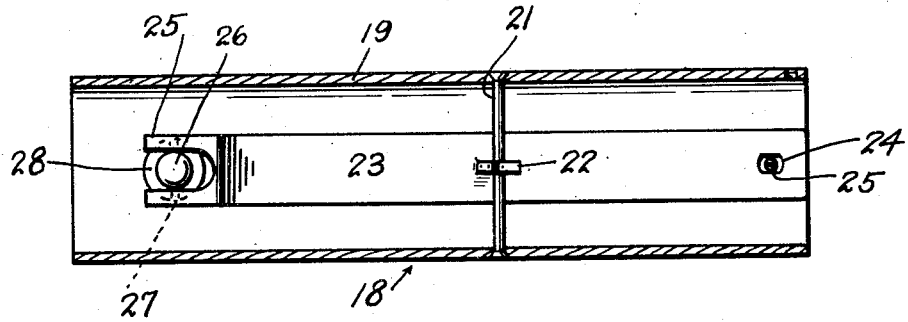
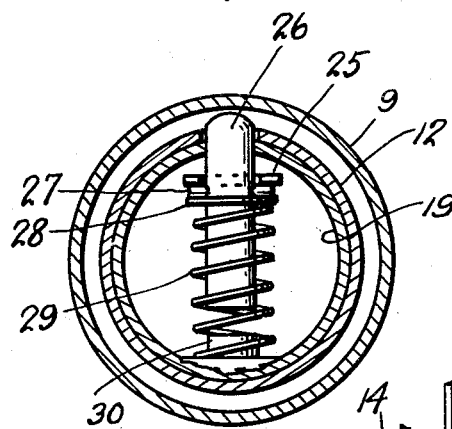 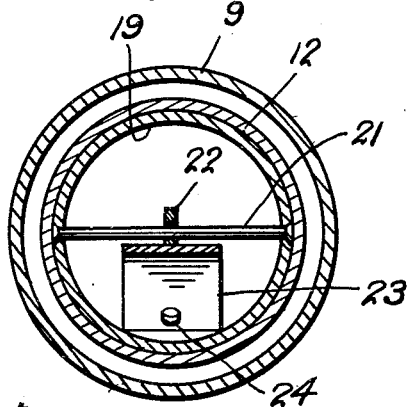
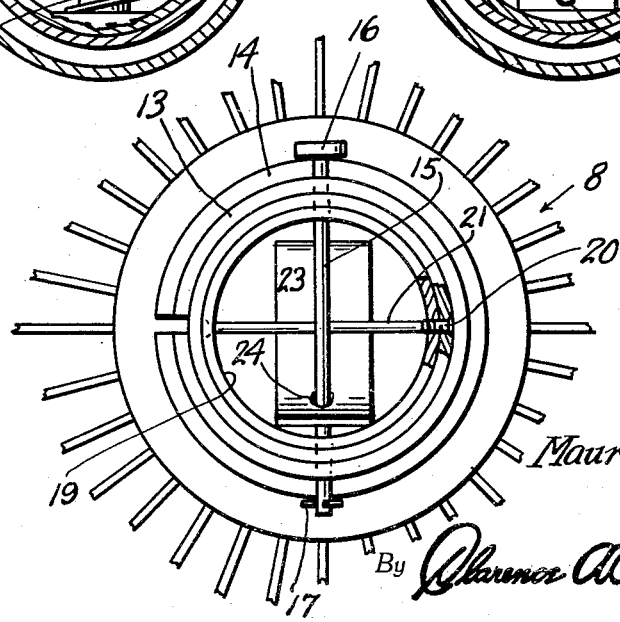
Inventor
Maurice L. Bowers
By Clarence A. O'Brien
Attorney Patented Dec. 9, 1930

1,784,330

UNITED STATES PATENT OFFICE

MAURICE L. BOWERS, OF LONG BEACH, CALIFORNIA

WHEEL RETAINER

Application filed June 14, 1929. Serial No. 370,997.

This invention relates to a safety retaining device which is especially, but not necessarily adapted for use in association with aircraft wheels, particularly the type mounted on present day aeroplanes.

It is a matter of common knowledge that it is practically an impossible feat for an aeroplane to land if one or both of the wheels are missing. Then, too, it seems to be a current mishap to accidentally lose a wheel unknowingly while in mid air.

This has resulted in serious accident and has produced a fear among aviators, especially of the student class, for only masterly handling of the craft will avoid an accident in landing when one of the wheels has come off.

With this menace in mind, I have evolved and produced a simple and inexpensive means which may be associated with the present day types of airplane wheels and which is characterized principally by a spring pressed retaining latch and associated details providing an appliance which may be placed in position without requiring alterations of the existing details and which may be depended upon to fulfill the requirements of a structure of this class.

The specific elements and their particular association and arrangement will become more readily apparent from the following description and drawings.

In the drawings:

Figure 1 is a central longitudinal sectional view, showing a fragmentary portion of a wheel hub, hollow axle, and the retaining device associated therewith, in accordance with the present invention.

Figure 2 is a perspective view of the releasing lever constituting a part of the invention.

Figure 3 is a group perspective view of elements constituting the latch unit.

Figure 4 is a horizontal sectional view, taken approximately upon the plane of the line 4—4 of Figure 1 with parts shown in elevation.

Figures 5 and 6 are transverse vertical sections on the line 5—5 and 6—6 respectively of Figure 1, and Figure 7 is an end view of the structure seen in Figure 1, observing the details in a direction from right to left, parts broken away.

Attention is first invited to Figure 1, wherein it will be seen that the reference character 8 designates generally the common wire spoke aeroplane wheel. This comprises a tubular hub 9, having internal rigidly fastened bushings 10 and 11 at its opposite ends.

The reference character 12 designates the customary tubular or hollow axle which extends through the bushings and hub and beyond the right hand end of the hub. Mounted on the extended end is the retaining collar 13 having an inner flange 14. This is ordinarily held in place by a pin 15, extending through diametrically opposite openings and bearing against the flange, provided at one end with the retaining head 16 and at the opposite end with a cotter key 17. This cotter key is subject to accidental displacement permitting the pin 15 to become loosened and allowing the wheel to drop off.

The improved safety device is generally designated by the reference character 18 in Figure 4 and comprises an open ended sleeve 19, which is adapted to fit telescopically into the axle as seen in Figure 1. It constitutes a brace and a mounting for the retaining parts. At the right hand end is the screw threaded opening to accommodate a retaining screw 20 which is threaded through the axle as seen in Figure 7. At the center is a horizontal cross rod 21, constituting a pivot, on which the ear 22 of the releasing lever 23 is mounted. This lever is formed at the outer end with an opening 24 through which the aforesaid pin 15 extends. At the opposite end is a laterally offset fork 25.

The forked end of the releasing lever is cooperable with a retaining latch in the form of a novel assembly or unit made up of the parts seen in Figure 3. The latch proper is designated by the reference character 26 and this carries a cross pin 27 cooperating with a washer 28, and an expansion coiled spring 29. One end of the spring bears against the washer and the other end surrounds an anchoring stud 30 which is securely fastened on the interior of the sleeve. The sleeve 19 as well as the axle 12 is formed with an opening. These two openings are in registry with each other as seen in Figure 1, thus allowing the projectable end of the latch bolt 26 to extend therethrough. The fork arms of the forks 25 straddle the latch above the cross pin 27. Under normal conditions the spring serves to maintain the latch in securing position. Thus, in case the outer end of the wheel structure should break, the latch will come into play to prevent displacement of the wheel. When, however, it is desired to remove the wheel, this may be easily done, by inserting a screw driver or the like, underneath the apertured end 24 of the releasing lever 23, prying it upwardly and forcing down against the latch against the action of the spring to release the latch.

A careful consideration of the description in conjunction with the drawings will enable the reader to obtain a clear understanding of the purpose of the invention, the method of assembly, the features and advantages as well as the method of operation.

Therefore a more lengthy description is believed to be unnecessary. Minor changes in shape, size, materials and rearrangement of details coming within the scope of invention claimed may be resorted to, in actual practice, if desired.

I claim:

1. In a structure of the class described, in combination, a hollow axle, a hollow hub mounted for rotation on said axle, a bracing sleeve within said axle, and a spring pressed retaining latch carried by the sleeve, the sleeve and the axle being provided with aligned openings through which the retaining end of said latch projects, and a lever pivotally mounted intermediate its ends within said sleeve, and cooperable with said latch, whereby to permit the latch to be retracted to allow the sleeve to be removed or to allow the hub to be removed from said axle.

2. In a safety retaining device of the class described, a latch assembly including a latch bolt, a spring abutment washer surrounding the bolt, a retaining pin carried by the bolt and cooperable with the washer, a spring surrounding said bolt below the washer, an anchoring stud, means for guiding the bolt, said spring cooperating at one end with said stud, and means for mounting said latch assembly within the axle of a wheel structure.

3. In a structure of the class described, an open ended sleeve provided adjacent one end with a latch hole and provided adjacent its opposite end with diametrically opposite pin holes, a cross pivot arranged intermediate the ends of said sleeve, a spring pressed latch mounted within the sleeve at one end and having its retaining end projectable through said latch hole, and a lever pivoted intermediate its ends on said cross pivot and having a fork at one end, the arms of which straddle the latch bolt within said sleeve, the lever being formed at its opposite end with an opening for registry with the aforesaid pin holes.

In testimony whereof I affix my signature.

MAURICE L. BOWERS.